Aug. 29, 1961   W. WALDHERR   2,998,168
FLUID DISPENSER

Original Filed Jan. 29, 1958   7 Sheets-Sheet 1

INVENTOR
WILHELM WALDHERR
BY
HIS AGENT

Aug. 29, 1961  W. WALDHERR  2,998,168
FLUID DISPENSER

Original Filed Jan. 29, 1958  7 Sheets-Sheet 6

INVENTOR
WILHELM WALDHERR
BY *[signature]*
HIS AGENT

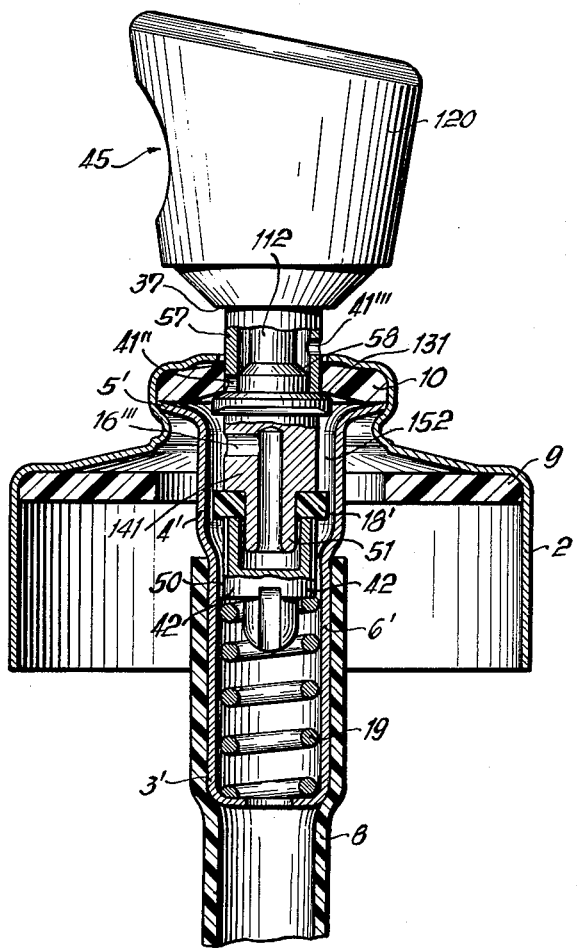

United States Patent Office 2,998,168
Patented Aug. 29, 1961

2,998,168
FLUID DISPENSER
Wilhelm Waldherr, Mannheim, Germany
Original application Jan. 29, 1958, Ser. No. 712,010, now Patent No. 2,933,222, dated Apr. 19, 1960. Divided and this application Jan. 5, 1960, Ser. No. 1,400
8 Claims. (Cl. 222—394)

The present invention relates to fluid dispensing devices, and more particularly to spray dispensing valves adapted to discharge a fluid from a container.

This is a division of my copending application Serial No. 712,010, filed January 29, 1958, now Patent No. 2,933,222, granted April 19, 1960.

In my U.S. Patent No. 2,858,053, granted October 28, 1958, I have described and claimed a fluid dispensing device adapted to be mounted on the discharge opening of a container and comprising a valve means including a tubular valve shaft longitudinally reciprocable in a valve housing. The container may be filled with fluid under pressure through an axial bore in the valve shaft and the fluid under pressure may be dispensed from the container through the valve means in metered amounts.

This invention is concerned with improvements in such a fluid dispensing valve structure.

In accordance with the present invention, I provide a fluid dispensing valve structure comprising a tubular valve housing extending into the container and in communication with its interior. The valve structure is mounted on the container in a fluid-tight manner by providing a cap and a fluid-tight resilient sealing means clamped between the cap and an upper flange of the tubular valve housing. The valve housing has an upper portion and a lower portion of smaller diameter than the upper portion. A tubular valve shaft extends into the valve housing and has a hollow end portion therein while its outer end extends out of the valve housing and the container with a portion adapted to receive a spray head. The outwardly extending valve shaft portion has an axial fluid passage throughout its length. A valve head is mounted in the lower portion of the valve housing on a compression spring biased to press the valve head into closing relationship with the hollow valve shaft portion and then to press the valve shaft upwardly into a rest position. The valve shaft has a flange above the hollow valve shaft end portion, which engages the resilient sealing means in a fluid-tight manner when the valve shaft is pressed upwardly into the rest position. The upper portion of the valve housing defines an annular fluid metering chamber around the valve shaft and a fluid passage means is provided in the valve shaft to connect the interior of the hollow shaft valve end portion with the fluid metering chamber. A resilient sealing ring is mounted between the valve shaft and the valve head so as to move therewith, the outer diameter of the sealing ring being smaller than the diameter of the upper portion of valve housing and at least as large as the diameter of the lower portion of the valve housing.

In accordance with one embodiment of the invention, the axial fluid passage in the outwardly extending valve shaft portion is separated from the interior of the hollow valve shaft end portion by a wall, radial fluid passage means being provided in the valve shaft for communication with the axial fluid passage as well as the interior of the hollow valve shaft end portion.

In accordance with another embodiment of the invention, the axial fluid passage is in direct communication with the interior of the hollow valve shaft end portion, a radial fluid passage means being provided in the valve shaft for communication with the axial fluid passage.

According to one feature of the invention, the valve head and the hollow valve shaft end portion are so shaped that the valve head is telescoped over the valve shaft end portion, with the sealing ring clamped therebetween in the rest position, the outer contours of the valve head and the valve shaft forming a continuous cylinder.

The objects and features of the present invention will become more apparent by reference to the following detailed description of some specific embodiments thereof, taken in conjunction with the accompanying drawing wherein:

FIG. 7 shows a sectional view of still another embodiment in the rest position.

Figure 1:
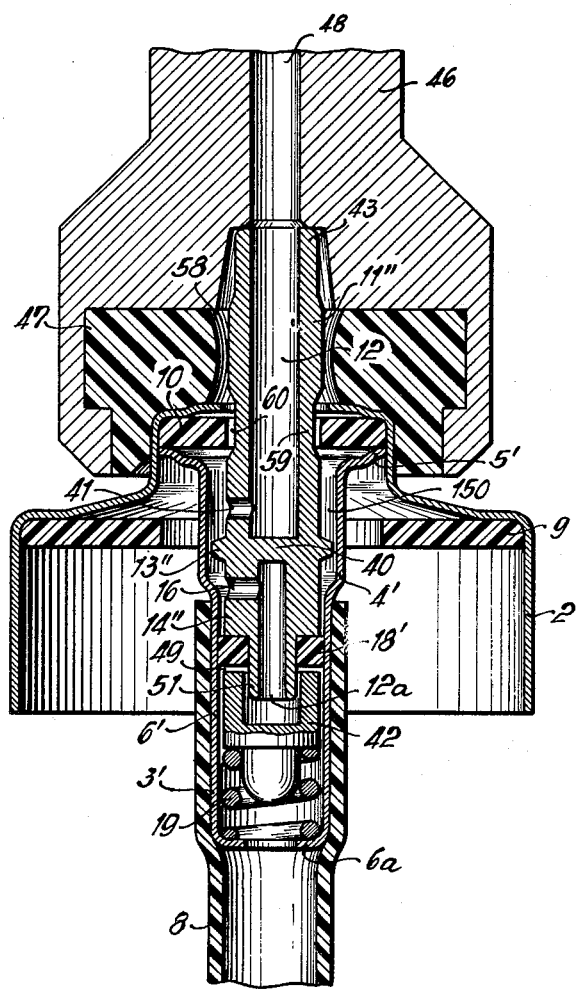
FIG. 1 is a vertical section of a dispensing valve structure according to one embodiment of the invention, in its filling position.

In the drawing, the same reference numerals are applied to identical parts in all embodiments and such identically numbered parts are substantially identical in structure, function and operation. Therefore, to eliminate confusing duplication, these parts, their inter-relationship and their function will be described only in conjunction with a single embodiment, such description applying to all embodiments where these parts appear.

Figure 2:
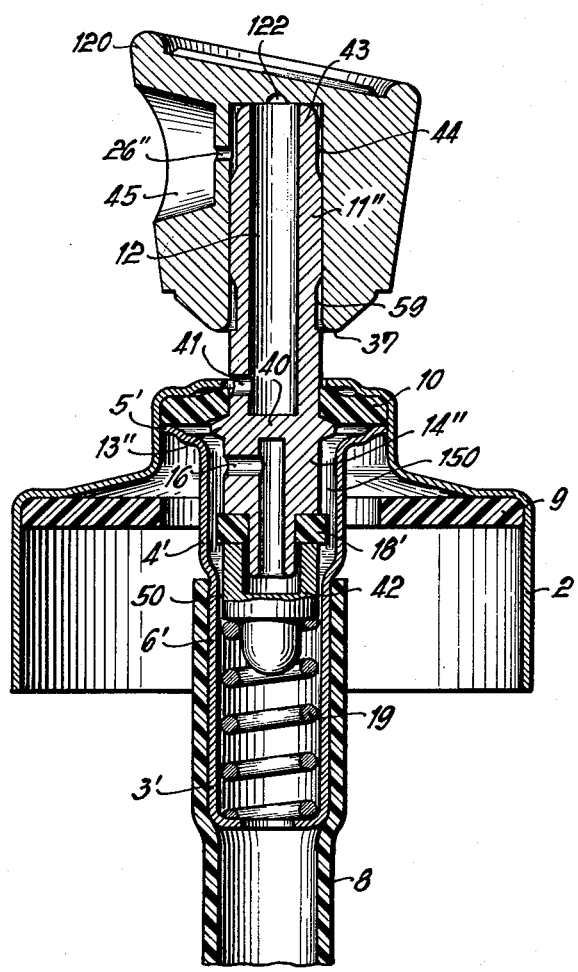
FIG. 2 shows a similar view of the dispensing valve structure of FIG. 1, with a spray head mounted thereon, in its rest position.
Figure 3:
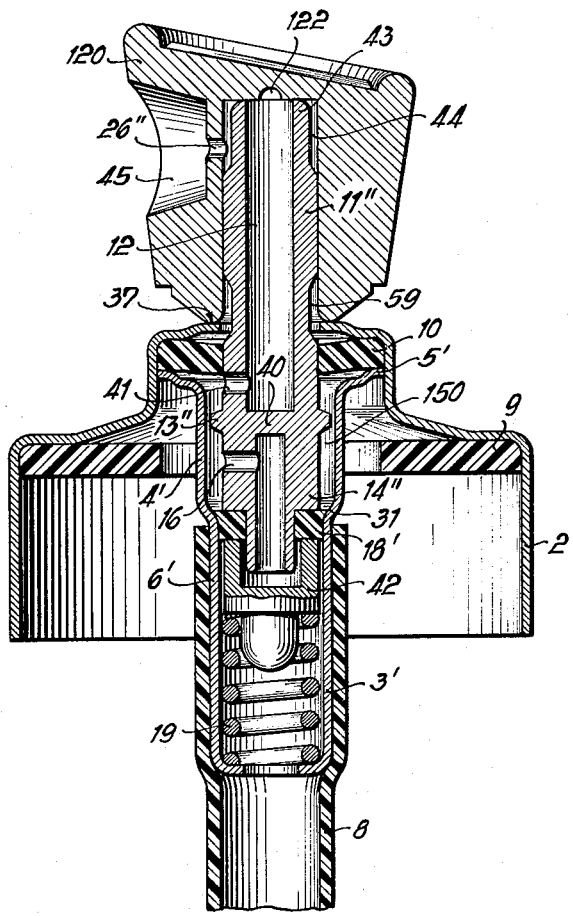
FIG. 3 shows the device of FIG. 2 in the fluid dispensing position.

Referring now to FIG. 1, one embodiment of the dispensing device of this invention is shown in the filling position. The dispensing device of this embodiment is mountable on the neck (not shown) of a container by means of cap 2, as illustrated in FIGS. 1–3. Valve housing 3' includes upper tubular portion 4' ending in annular flange 5' and lower tubular portion 6' of slightly smaller diameter than the upper housing portion. Flexible hose 8 reaching to the bottom of the container (not shown) is attached to the lower housing portion. Resilient sealing ring 9 is mounted between the cap 2 and the neck rim (not shown) of the container to establish a fluid-tight seal between the dispenser and the container. A further resilient sealing ring 10 between cap and annular valve housing flange 5' is provided to seal off the valve housing 3'.

A valve shaft 11'' with an axial fluid passage bore 12 is mounted for longitudinal reciprocation in the valve housing. The shaft has a flange 13'' which is glidable with some play in upper valve housing portion 4', followed by a hollow end portion 14'' which is glidably guided in lower housing portion 6'. The valve shaft and the upper valve housing portion define an annular metering chamber 150.

A lateral port 16 in the hollow valve shaft end portion 14'' connects the metering chamber with the hollow interior of this valve shaft portion. Transverse separating wall 40 closes off bore 12 of the valve shaft from the coaxial bore 12a in valve shaft portion 14'' which communicates with the metering chamber through port 16. A lateral port 41 is so positioned in the valve shaft 11'' above separating wall 40 that it will be above sealing ring 10 in communication with the atmosphere when the dispensing device is in its rest position (FIG. 2) while it will be below the sealing ring in communication with the metering chamber in the dispensing position (FIG. 3).

Valve head 42 is an essentially cup-shaped member received on the short tubular extension 51 of the valve shaft portion 14'', a resilient sealing ring 18' being mounted between portion 14'' and the valve head. Compression spring 19 is biased to press the valve head upwardly against the valve shaft, the spring being supported on inwardly extending annular rim 6a of the lower valve housing portion 6'.

In FIG. 1, there is shown a filling head 46 mounted on the valve shaft 11", a fluid-tight sealing ring 47 being provided in the recessed interior of the filling head in engagement with and surrounding the cap 2. The filling head has a longitudinal bore 48 coaxial and in communication with bore 12 of the valve shaft. As shown, the valve shaft is depressed sufficiently to push the sealing ring 18' into the lower valve housing portion 6' and to seal this housing portion when the filling head with its sealing ring 47 tightly engages the cap 2. In this filling position, the valve shaft bore 12 is in communication with the metering chamber 150 through port 41 and the metering chamber is in communication with the longitudinal bore 12a in the hollow valve shaft end portion through port 16. When it is desired to fill the container, a source of liquid to be sprayed and a source of propellant gas or of liquid-gas mixture is connected to the filling head. When the fluid from the source is fed to bore 48 under pressure, the valve head 42 is moved downwardly against the bias of spring 19 so that the fluid flows through bores 48 and 12, ports 41 and 16, and the interspace 49 between sealing ring 18' and the upper rim of the valve head 42 into bore 8 and the interior of the container. When the fluid supply is discontinued and the fluid supply source disconnected, the valve head immediately returns into sealing engagement with the sealing ring 18' under the pressure of spring 19. Thus, the interior of the container is sealed off from communication with the atmosphere. When the filling head is dismounted, the valve shaft returns into the rest position (FIG. 2) under the combined pressure of spring 19 and the pressure of the liquid-propellant gas mixture in the interior of the container.

As shown, the filling process may be expedited by providing access to the interior of the container not only through bore 12 and port 41 but also through an annular chamber 58 between the valve shaft 11" and the spray head 46 and packing 47, said chamber being in communication with an annular slot 60 formed between sealing ring 10 and a constricted portion 59 of the valve shaft. Thus, the fluid under pressure will flow into the interior of the container through bore 12 as well as through slot 60, the latter flow being further increased, if desired, by providing lateral ports in the upper portion of shaft 11" in communication with annular chamber 58. Also, if desired, the central cylindrical bore 48 in the spray head may be replaced by an annular feed channel in direct communication with annular chamber 58, thus filling the container only through this annular chamber rather than through bore 12.

Thus, it can be seen that, depending on the specific configuration of the spray head and the valve shaft, the container may be filled only through the bore 12, through bore 12 and chambers 58, 60 or only through chambers 58, 60.

After the container is filled and the filling head is removed from the valve shaft, spray head 120 is mounted thereon, as shown in FIGS. 2 and 3. Valve shaft end 43 is annularly constricted at 44 to form an annular chamber between the shaft end and the spray head mounted thereover in frictional engagement with the shaft. The annular chamber 44 is in communication with lateral port 26" in the spray head wall and this port leads to spray nozzle 45.

In the rest position (FIG. 2), metering chamber 150 is in communication with the interior of the container through annular passage 50 between the valve head 42 and the lower valve housing portion 6'. The working stroke of the valve may be delimited by providing a lower shoulder 37 on the spray head to engage the upper surface of cap 2 when the spray head is depressed (see FIG. 3). In the dispensing position, the sealing ring 18' is positioned at shoulder 31 of the valve housing between housing portions 4' and 6', thus sealing off communication between the interior of the container and the metering chamber 150. At the same time, flange 13" of the valve shaft has been moved out of sealing engagement with sealing ring 10 so that the metering chamber is no longer sealed off from communication with bore 12 in the valve shaft. The port 41 has moved from just above the sealing ring to a position below ring 10, establishing communication between metering chamber 150 and bore 12. Accordingly, the liquid-propellant gas mixture in the metering chamber will flow from the metering chamber through port 41 into bore 12 whence it will flow through transverse groove 122 in the spray head into annular chamber 44, lateral bore 26" and out of spray nozzle 45.

Figure 4:
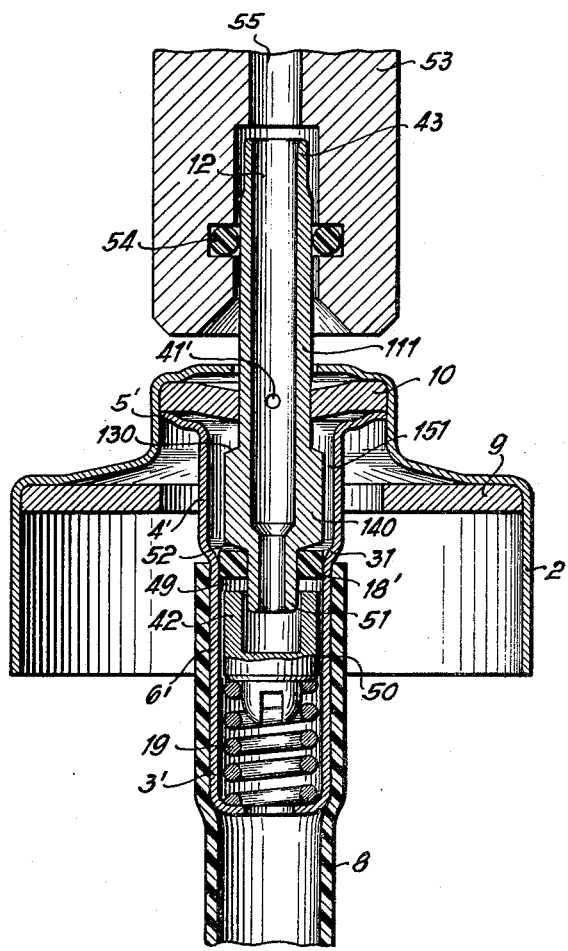
FIGS. 4 to 6 are views similar to those of FIGS. 1 to 3 of another embodiment of the dispensing device.
Figure 5:
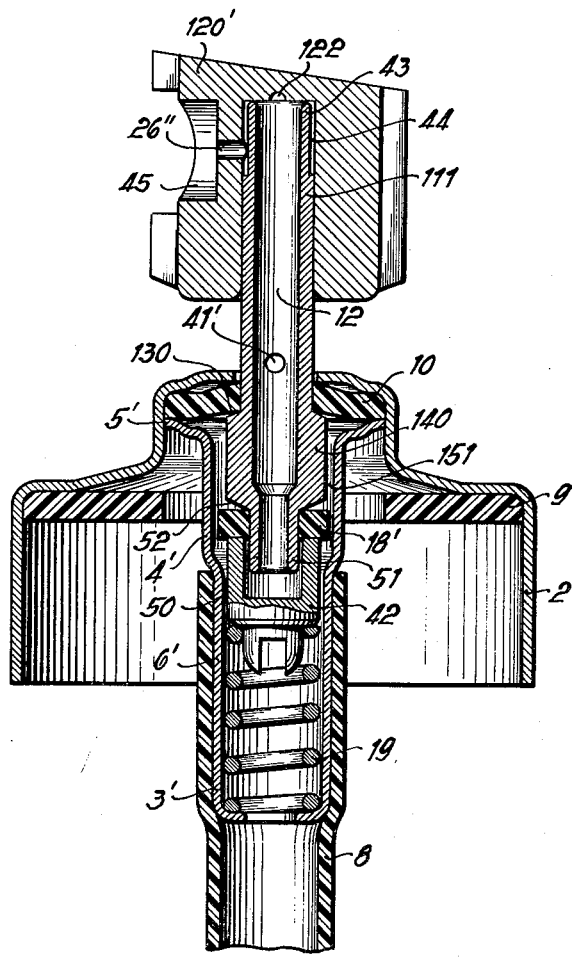
Figure 6:
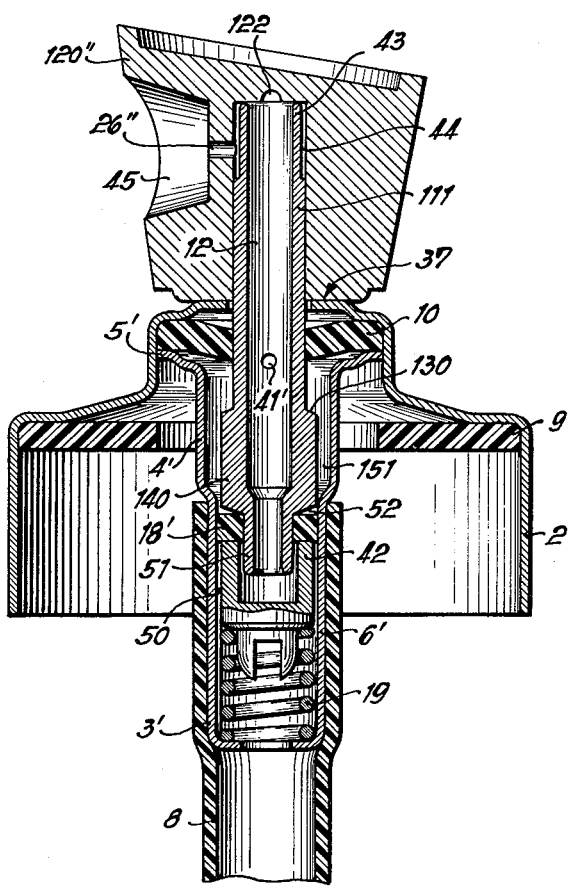

FIGS. 4–6 illustrate an embodiment similar to the one shown in FIGS. 1–3 and operating in the same manner except where otherwise indicated. In this embodiment, the separating wall 40 between the upper longitudinal bore in the valve shaft and the longitudinal bore in the hollow valve shaft end portion 14" is eliminated so that bore 12 leads through the entire shaft 111. Shaft 111 has elongated flange 140 forming shoulder 130 at its upper end, the hollow shaft end portion 51 extending below the flange. As in the embodiment of FIGS. 1–3, the valve shaft end portion receives the valve head 42 in glidable engagement therewith. Sealing ring 18' is mounted on the shaft portion 51 between flange shoulder 52 and the valve head, thus sealing off the interior of the container from metering chamber 151 in the filling position (FIG. 4) and the lower valve housing portion 6' in the dispensing position (FIG. 6).

As shown in the filling position of FIG. 4, a filling head 53 may be mounted on the valve shaft, a fluid-tight connection being assured by annular packing 54 mounted in a recessed annular groove in the filling head for engagement with the valve shaft 111. The valve shaft is depressed against the bias of spring 19 until sealing ring 18' is positioned at shoulder 31 of valve housing 3' between housing portions 4' and 6'. When a source of liquid and propellant gas is connected to bore 55 in the filling head and fluid is fed thereto under pressure, the fluid pressure forces valve head 42 to move downwardly against the pressure of spring 19 so that the fluid flows through space 49 and annular passage 50 into the interior of the container. After the container is filled and the fluid source disconnected, the device returns to its rest position (FIG. 5) in the same manner as described in connection with FIG. 1.

The slightly different spray heads 120' and 120" shown in FIGS. 5 and 6, respectively, are substantially the same as the spray head 120 of FIGS. 2 and 3 although somewhat differently shaped. Like parts of these spray heads carry like reference numerals and operate in the same manner.

When the dispensing device is in the rest position of FIG. 5, the lateral port 41' in the valve shaft 111 is out of communication with metering chamber 151. When the spray head is depressed into the dispensing position of FIG. 6, port 41' establishes inter-communication between metering chamber 151, longitudinal bore 12, transverse groove 122, annular chamber 44 and spray nozzle 26''', 45, thus providing a metered spray of the liquid from the nozzle.

FIG. 7 illustrates yet another embodiment of the invention, like parts (and their function) again being the same as those carrying the same reference numerals in the other embodiments. The valve shaft of this dispensing device comprises a solid rod 112 carrying a tubular portion 57 mounted thereover so as to form an annular chamber 58 between the center rod 112 and tube 57. If desired, spacing members may be mounted between the rod and the tube to center the assembly. Tube 57 has lateral ports 41" or 41''' whose functions will be explained hereinafter.

The valve shaft includes flange 131 and the hollow end portion 141 with its tubular extension 51 guiding the valve head. The hollow interior of the valve shaft end portion is connected to metering chamber 152 by means of lateral port 16'''.

Port 41''' has the function of port 41 or 41' of the previously described embodiments. This embodiment will function in the same manner as these embodiments.

What I claim is:

1. A fluid dispensing device adapted to be mounted on the open top of a container and to constitute its closure, comprising in combination: a tubular valve housing adapted to fit into the open container top, said valve housing comprising a larger diameter upper portion having an outer end and a small diameter lower portion, a tubular valve shaft longitudinally glidable in said valve housing, said valve shaft having a shaft portion extending outside said valve housing and another portion extending inside said valve housing, a short tubular extension on said other valve shaft portion, coaxial bores being provided in said outwardly and inwardly extending valve shaft portions, a transverse separating wall between said bores, an annular cap for mounting the assembled valve shaft and housing in a fluid-tight manner on the open container top, a resilient annular sealing means mounted between the cap and the outer end of the valve housing, a compression spring supported in the lower valve housing portion, a cup-shaped valve head having an annular element surrounding and glidably engaging said other valve shaft portion extension, said extension and annular valve head element defining an annular interspace and the axial bore in the other valve shaft portion being in communication with said annular interspace, an annular sealing member mounted about said extension between the annular valve head element and the other valve shaft portion, the outer diameter of said sealing member being smaller than the diameter of the upper valve housing portion and at least as large as the diameter of the lower valve housing portion, said compression spring being so biased as to press the valve head against said sealing member to seal off said annular interspace and to press the valve shaft outwardly into a rest position, the valve shaft and the upper valve housing portion defining an annular fluid metering chamber, an annular flange on the valve shaft within said metering chamber and in sealing contact with said resilient annular sealing means in the rest position, said metering chamber and the interior of the lower valve housing portion, being in communication in the rest position through an annular passage between the lower valve housing portion and the valve head, said last-named annular passage being sealed by said annular sealing member when the valve shaft is depressed against the compression spring bias so that the sealing member engages the lower valve housing portion, a first lateral port means positioned in the outwardly extending valve shaft portion above said separating wall and in communication with the axial bore in said latter valve shaft portion, said first lateral port means being positioned outwardly of said annular resilient sealing means in said rest position and positionable inwardly of said sealing means in communication with the fluid metering chamber when the valve shaft is depressed into a dispensing position, and a second lateral port means positioned in said other valve shaft portion below said separating wall and interconnecting the metering chamber and the axial bore in the other valve shaft portion to provide a fluid inlet passage between the axial bores through said first and second port means when the shaft is depressed to interconnect the first port means with the metering chamber, the valve head being movable away from the annular sealing member under fluid pressure to establish communication between the axial bore in the other valve shaft portion and the interior of the valve housing through the annular slot between the valve and the lower valve housing portion.

2. The dispensing device of claim 1, comprising a spray head detachably mounted in a fluid-tight manner on the outwardly extending valve shaft portion, a spray nozzle in said spray head, and fluid passage means interconnecting the axial bore in the outwardly extending valve shaft portion with said spray nozzle, the spray head having a stop means spaced from the cap in the rest position and engaging the cap when the spray head and valve shaft are depressed to delimit the downward stroke thereof.

3. A fluid dispensing device adapted to be mounted on the open top of a container and to constitute its closure, comprising in combination: a tubular valve housing adapted to fit into the open container top, said valve housing comprising a larger diameter upper portion having an outer end and a smaller diameter lower portion, a tubular valve shaft longitudinally glidable in said valve housing, said valve shaft having a shaft portion extending outside said valve housing and another portion extending inside said valve housing, a short tubular extension on said other valve shaft portion, a longitudinal bore through said valve shaft, an annular cap for mounting the assembled valve shaft and housing in a fluid-tight manner on the open container top, a resilient annular sealing means mounted between the cap and the outer end of the valve housing, a compression spring supported in the lower valve housing portion, a cup-shaped valve head having an annular element surrounding and glidably engaging said other valve shaft portion extension, said extension and annular valve head element defining an annular interspace and the longitudinal bore being in communication with said annular interspace, an annular sealing member mounted about said extension between the annular valve head element and the other valve shaft portion, the outer diameter of said sealing member being smaller than the diameter of the upper valve housing portion and at least as large as the diameter of the lower valve housing portion, said compression spring being so biased as to press the valve head against said sealing member to seal off said annular interspace and to press the valve shaft outwardly into a rest position, the valve shaft and the upper valve housing portion defining an annular fluid metering chamber, an annular flange on the valve shaft within said metering chamber and in sealing contact with said resilient annular sealing means in the rest position, said metering chamber and the interior of the lower valve housing portion being in communication in the rest position through an annular passage between the lower valve housing portion and the valve head, said last-named annular passage being sealed by said annular sealing member when the valve shaft is depressed against the compression spring bias so that the sealing member engages the lower valve housing portion, and lateral port means positioned in the outwardly extending valve shaft portion in communication with said longitudinal bore, said lateral port means being positioned outwardly of said annular resilient sealing means in said rest position and positionable inwardly of said sealing means in communication with the fluid metering chamber when the valve shaft is depressed into a dispensing position.

4. A fluid dispensing device adapted to be mounted on the open top of a container and to constitute its closure, comprising in combination: a tubular valve housing adapted to fit into the open container top, said valve housing comprising a larger diameter upper portion having an outer end and a smaller diameter lower portion, a valve shaft longitudinally glidable in said valve housing, said valve shaft having a shaft portion extending outside said valve housing and another portion extending inside said valve housing, a short tubular extension on said other valve shaft portion, a tube mounted on the valve shaft portion extending outwardly of the valve housing and defining an annular fluid passage chamber with said valve shaft portion, an axial bore in said other valve shaft portion, an annular cap for mounting the assembled valve shaft and housing in a fluid-tight manner on the open container top, a resilient annular sealing means mounted between the cap and the outer end of the valve housing, an annular flange on said valve shaft between the shaft tube and the other shaft portion, a compression spring supported in the lower valve housing portion, a cup-shaped valve head having an annular element surrounding and glidably engaging said extension, said extension and annular valve head element defining an annular interspace, the extension separating said annular interspace from the bore in the other valve shaft portion when the valve head is pressed into an outward end position by the compression spring and the bore being in communication with said annular interspace when the valve head is depressed against the bias of the spring, the other portion of the valve shaft and the upper valve housing portion defining an annular fluid metering chamber, said metering chamber and the interior of the lower valve housing portion being in communication in the outward end position through an annular passage between the lower valve housing portion and the valve head, a first lateral port means positioned in said valve shaft tube above said annular valve shaft flange and in communication with the said annular fluid passage chamber in the outwardly extending valve shaft portion, said valve shaft flange engaging the annular resilient sealing means in said outward end position to maintain the first lateral port means out of communication with the metering chamber and said port means being positionable inwardly of said sealing means in communication with the metering chamber when the valve shaft is depressed into a dispensing position, and a second lateral port means positioned in said other valve shaft portion below said flange and interconnecting the metering chamber and the bore in the other portion to provide a fluid inlet passage between the annular fluid passage chamber and said bore through said first and second port means when the shaft is depressed to interconnect the first port means with the metering chamber, the valve head being movable away from the other valve shaft portion extension under fluid pressure to establish communication between the annular fluid passage chamber and the interior of the valve housing through the annular interspace.

5. A fluid dispensing device adapted to be mounted on the open top of a container and to constitute its closure, comprising in combination: a tubular valve housing adapted to fit into the open container top, said valve housing comprising a larger diameter upper portion having an outer end and a smaller diameter lower portion, a tubular valve shaft longitudinally glidable in said valve housing, said valve shaft having a shaft portion extending outside said valve housing and a hollow end portion extending inside said valve housing, an axial fluid passage throughout the length of the outwardly extending valve shaft portion, an annular cap for mounting the assembled valve shaft and housing in a fluid-tight manner on the open container top, a resilient annular sealing means mounted between the cap and the outer end of the valve housing, a compression spring supported in the lower valve housing portion, a valve head glidably mounted on said hollow valve shaft end portion and being biased by said compression spring for closing engagement with said hollow end portion of the valve shaft, a resilient sealing ring mounted between said hollow valve shaft end portion and the valve head for movement with the valve shaft end portion, the outer diameter of the sealing ring being smaller than the diameter of the upper valve housing portion and at least as large as the diameter of the lower valve housing portion, said compression spring being biased to press the valve head against the sealing ring and to press the valve shaft outwardly from a dispensing position into a rest position, the valve shaft and the upper valve housing portion defining an annular fluid metering chamber, a flange on the valve shaft within said metering chamber and in sealing contact with the resilient annular sealing means in the rest position, and a fluid passage means in the valve shaft to connect the interior of the hollow valve shaft end portion with the fluid metering chamber and to connect the metering chamber in the dispensing position with the axial fluid passage.

6. The fluid dispensing device of claim 5, further comprising a separating wall between the axial fluid passage in the outwardly extending valve shaft portion and the interior of the hollow valve shaft end portion, the fluid passage means being constituted by a radial bore in said end portion and another radial bore being provide in the outwardly extending valve portion.

7. The fluid dispensing device of claim 5, wherein the valve head and the hollow valve shaft end portion are so shaped that the valve head is telescoped over the valve shaft end portion, with the sealing ring clamped therebetween in the rest position, the outer contours of the valve head and the valve shaft forming a continuous cylinder.

8. The fluid dispensing device of claim 5, wherein the valve head is cup-shaped with an annular element of the cup-shaped valve head telescoping over the lower end of the hollow valve shaft portion.

References Cited in the file of this patent

UNITED STATES PATENTS

| | | |
|---|---|---|
| 2,693,983 | Howell | Nov. 9, 1954 |
| 2,747,796 | St. Germain | May 22, 1956 |
| 2,802,490 | Ward | Aug. 13, 1957 |
| 2,835,417 | Kiraly | May 20, 1958 |
| 2,858,053 | Waldherr | Oct. 28, 1958 |
| 2,932,432 | Beard | Apr. 12, 1960 |
| 2,933,222 | Waldherr | Apr. 19, 1960 |